(12) United States Patent
Lee

(10) Patent No.: US 12,162,484 B2
(45) Date of Patent: Dec. 10, 2024

(54) LANE FOLLOWING SYSTEM AND METHOD CONSIDERING DRIVING ASSISTANCE LANE

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 203 days.

(21) Appl. No.: 18/146,405

(22) Filed: Dec. 26, 2022

(65) Prior Publication Data

US 2023/0406300 A1    Dec. 21, 2023

(30) Foreign Application Priority Data

Jun. 16, 2022    (KR) .................. 10-2022-0073368

(51) Int. Cl.
*B60W 30/12*    (2020.01)
*B60W 10/20*    (2006.01)
*B60W 50/00*    (2006.01)
*G06V 10/75*    (2022.01)
*G06V 10/764*    (2022.01)
*G06V 20/56*    (2022.01)

(52) U.S. Cl.
CPC ............ *B60W 30/12* (2013.01); *B60W 10/20* (2013.01); *B60W 50/0098* (2013.01); *G06V 10/751* (2022.01); *G06V 10/764* (2022.01); *G06V 20/588* (2022.01); *B60W 2050/0011* (2013.01); *B60W 2420/403* (2013.01); *B60W 2552/53* (2020.02); *B60W 2710/207* (2013.01)

(58) Field of Classification Search
CPC .. B60W 30/12; B60W 10/20; B60W 50/0098; B60W 2050/0011; B60W 2420/403; B60W 2552/53; B60W 2710/207; B60W 30/10; B60W 30/18163; B60W 40/06; G06V 10/751; G06V 10/764; G06V 20/588; G05D 3/12; G06T 7/11; G06T 7/73

See application file for complete search history.

(56) References Cited

U.S. PATENT DOCUMENTS

| | | | | |
|---|---|---|---|---|
| 2018/0365858 | A1* | 12/2018 | Kim | G06T 7/13 |
| 2022/0171977 | A1* | 6/2022 | Oh | B60W 50/029 |
| 2022/0204041 | A1* | 6/2022 | Oh | B60W 60/0027 |
| 2022/0306150 | A1* | 9/2022 | Inoue | B60W 40/072 |
| 2022/0309804 | A1* | 9/2022 | Inoue | G06V 10/809 |
| 2023/0331231 | A1* | 10/2023 | Mujumdar | B60W 60/001 |

FOREIGN PATENT DOCUMENTS

KR    101358329 B1    2/2014

* cited by examiner

*Primary Examiner* — Richard M Camby
(74) *Attorney, Agent, or Firm* — NovoTechIP International PLLC

(57) ABSTRACT

The present invention provides a lane following system and method considering a driving assistance lane that can flexibly cope with complex roadway situations and enable lane following to improve the reliability of an LCA system, and furthermore, expand a range of a road to which an autonomous driving system is applied.

12 Claims, 6 Drawing Sheets

LANE FOLLOWING SYSTEM AND METHOD CONSIDERING DRIVING ASSISTANCE LANE

CROSS-REFERENCE TO RELATED APPLICATIONS

This application claims priority under 35 U.S.C. § 119 to Korean Patent Application No. 10-2022-0073368, filed on Jun. 16, 2022, in the Korean Intellectual Property Office, the disclosure of which is incorporated herein by reference in its entirety.

TECHNICAL FIELD

The following disclosure relates to a lane following system and method considering a driving assistance lane, and more particularly, to a lane following system and method considering a driving assistance lane capable of safely providing a driving assistance function stably through a change in a driving following lane by detecting a sudden change in an angle of a lane due to various structures, etc., that exist other than the lane on a roadway, that is, a change in a shape of the lane, in a process of providing a driving function to a center of the lane by an activated lane centering assistance (LCA) system.

BACKGROUND

A lane centering assistance (LCA) system serves to control a steering device (handle etc.) that may recognize a boundary line of both lanes (left and right lanes) and front vehicles on a vehicle road on which a vehicle is traveling with a camera mounted on a vehicle to allow the vehicle to drive along a center of the vehicle path (centerline of a vehicle path/centerline of a lane).

The LCA system function requires higher control accuracy than a lane departure warning (LDW) system that warns when there is a danger of lane departure or a lane keeping assistance (LKA) system that keeps a lane, and thus, it is possible to implement autonomous driving functions of level 2 or higher, which are currently the most advanced features of an advanced driver assistance system (ADAS) when used along with a smart cruise control (SCC) system.

In detail, the LCA system may recognize a left/right lane of an own vehicle path, calculate a centerline of the recognized left/right lane, and then control a direction of a vehicle to follow the centerline, so the vehicle may be driven along a center of a lane, thereby implementing stable driving.

The center of the vehicle path to be recognized to implement the LCA system means the centerline of both lanes (extracted using a lateral average value of the left and right lanes) as illustrated in FIG. 1, and the LCA system controls a steering device so that the centerline of both lanes and the centerline of the vehicle coincide with each other.

In this case, in the case of the centerline of the vehicle, since the camera mounted on the front of the vehicle is usually mounted to match the centerline of the vehicle, a centerline of image data obtained through the camera mounted on the front of the vehicle is set as the centerline of the vehicle.

However, in the case where a sudden change in an angle of a lane around a highway tollgate (see FIG. 2) having a complicated structure or a junction, an intersection section, etc., in other words, a change in a shape of a vehicle path that is uniformly maintained through both lanes occurs, when a vehicle is simply driven by following only the centerline of the vehicle path (the centerline of both lanes), there is a problem in that driving stability is lowered due to structures, etc.

Describing the vicinity of a highway toll gate by way of example, when the steering device is controlled along the centerline of the lane, a sudden change of direction occurs in front of the structures, so there is a problem that a collision or, in severe case, a rollover accident may occur due to a road bump.

In order to solve the problem that the recognition performance of the centerline of the lane is lowered due to the complex structures formed in the lane, the related art has attempted to improve the reliability of the LCA system by using a plurality of consecutive data.

However, in a situation in which the number of lanes changes, a sudden change in a vehicle path width, etc., occur, performance of a technique such as tracking greatly deteriorates, so it is inevitably difficult to implement an autonomous driving function.

Korean Patent Laid-Open Publication No. 10-1358329 ("Lane Keeping Control System and Method") discloses a technology of calculating a target trajectory of a vehicle reflecting a variable target distance using information obtained through a camera sensor and vehicle sensor and controlling steering of a vehicle to follow a target yaw rate calculated based on the calculated target trajectory.

However, in the above-described technology, a technology for smoothly controlling the steering of the vehicle in the situations in which the number of lanes changes, the vehicle path width suddenly changes, or the like due to the complex structure formed in the vehicle path is not considered.

SUMMARY

An embodiment of the present invention is directed to providing a lane following system and method considering a driving assistance lane capable of stably providing a driving assistance function by recognizing various colored guide lanes (when using tollgates, entering and exiting highways, etc.) formed in a vehicle path to change a driving following lane even when an angle of a lane suddenly changes, that is, a shape of a vehicle path changes, in a process of providing a driving function as a center of the vehicle path by an activated lane centering assistance (LCA) system.

In one general aspect, a lane following system considering a driving assistance lane for controlling a steering device of a driving vehicle considering the driving assistance lane formed in a vehicle path includes: an image receiving unit configured to receive front image data of the driving vehicle; an image analysis unit configured to input the front image data to a pre-stored network and analyze a feature map for each pixel; an analysis processing unit configured to extract a following change driving lane to be followed by the driving vehicle by using the analysis result by the image analysis unit; and a steering control unit configured to compare a following driving lane currently followed by the driving vehicle with the following change driving lane by the analysis processing unit and apply the comparison result to generate a control signal for controlling a steering angle of the vehicle.

The image analysis unit may determine whether there is a driving assistance lane having a preset feature by using features included in each pixel, and extract a pixel coordinate group according to the driving assistance lane when it is determined that there is the driving assistance lane.

The image analysis unit using a semantic segmentation network may include: a classification unit configured to perform a classification into a plurality of classes using brightness values for each pixel; a determination unit configured to set a preset predetermined class as a pixel according to the driving assistance lane, and determine whether there is the driving assistance lane including the predetermined class as a result of classification by the classification unit; and an output unit configured to output a coordinate group including corresponding pixels when there is the driving assistance lane including the predetermined class as the determination result by the determination unit.

The analysis processing unit may extract a centerline of the driving assistance lane according to the coordinate group by using a pre-stored analysis algorithm, and set the extracted centerline as a following change driving lane.

The steering control unit may include: a driving extraction unit configured to receive the front image data and extract a following lane currently followed by the driving vehicle; and a control output unit configured to compare and calculate a difference value between the extracted following lane and the following change driving lane, calculate a proportional, integral, differential (PID) control value so that the driving vehicle follows the following changing driving lane using the comparison calculation value, and generate a control signal accordingly.

The steering control unit may further include a change extraction unit configured to extract the following change driving lane and then generate a change guide lane extended so that the extracted following lane is linearly connected to a start point of the following change driving lane, and the control output unit may compare and calculate a difference value between the extracted following lane and the change guide lane, compare and calculate a difference value between the change guide lane and the following change driving lane, calculate a PID control value using the compared and calculated values so that the driving vehicle follows the following change driving lane along the change guide lane, and generate a control signal accordingly.

In another general aspect, a lane following method considering a driving assistance lane using a lane following system considering the driving assistance lane in which each step is performed by a calculation processing means includes: an image input step (S100) of inputting front image data of a driving vehicle; an image analysis step (S200) of inputting the front image data by the image input step (S100) to a pre-stored network and analyzing feature maps for each pixel; a following change extraction step (S300) of applying the analysis result of the image analysis step (S200) to a pre-stored analysis algorithm to extract a following change driving lane to be followed by a driving vehicle; a steering control step (S400) of comparing a following lane currently followed by the driving vehicle with the following change driving lane by the following change extraction step (S300) and generating a control signal for controlling a steering angle of the vehicle according to the comparison result; and before performing the steering control step (S400), a following driving extraction step (S10) of analyzing the front image data by the image input step (S100) to extract the following lane currently followed by the driving vehicle.

The image analysis step (S200) may include: a determination step (S210) of determining whether there is a driving assistance lane having a preset feature by using features included in each pixel; and a group extraction step (S220) of extracting a pixel coordinate group corresponding to the driving assistance lane when there is the driving assistance lane exists according to the determination result of the determination step (S210), and when it is determined that there is no driving assistance lane according to the determination result of the determination step (S210), the lane following system currently applied to the driving vehicle may be maintained.

The determination step (S210) using a semantic segmentation network may include: a classification step (S211) of performing a classification into a plurality of classes using brightness values for each pixel; and an existence determination step (S212) of determining whether there is the driving assistance lane based on the classification result by the classification step (S211) and whether there is a pixel including the predetermined class by setting a preset predetermined class as the pixel according to the driving assistance lane.

The following change extraction step S300 may extract a centerline of the driving assistance lane according to a pixel coordinate group extracted by the group extraction step S220, and set the extracted centerline as the following change driving lane.

The steering control step (S400) may include: a comparison calculation step (S410) of comparing and calculating a difference value between the following lane extracted by the following driving extraction step (S10) and the following change driving lane extracted by the following change extraction step (S300); and a control signal generation step (S420) of calculating a PID control value so that the driving vehicle follows the following change driving lane by using the comparison calculation value of the comparison calculation step (S410), and generating a control signal accordingly.

The steering control step (S400) may further include a guide lane generation step (S430) of generating a change guide lane that extends so that the following lane extracted by the following driving extraction step (S10) is linearly connected to a start point of the following change driving lane extracted by the following change extraction step (S300), in the comparison and calculation step S410, a difference between the following lane and the change guide lane may be compared and calculated, and a difference between the change guide lane and the following change driving lane may be compared and calculated, and in the control signal generation step S420, a PID control value may be calculated so that the driving vehicle follows the following change driving lane along the change guide lane by using the comparison and calculation values, and a control signal may be generated accordingly.

DETAILED DESCRIPTION

Figure 1:
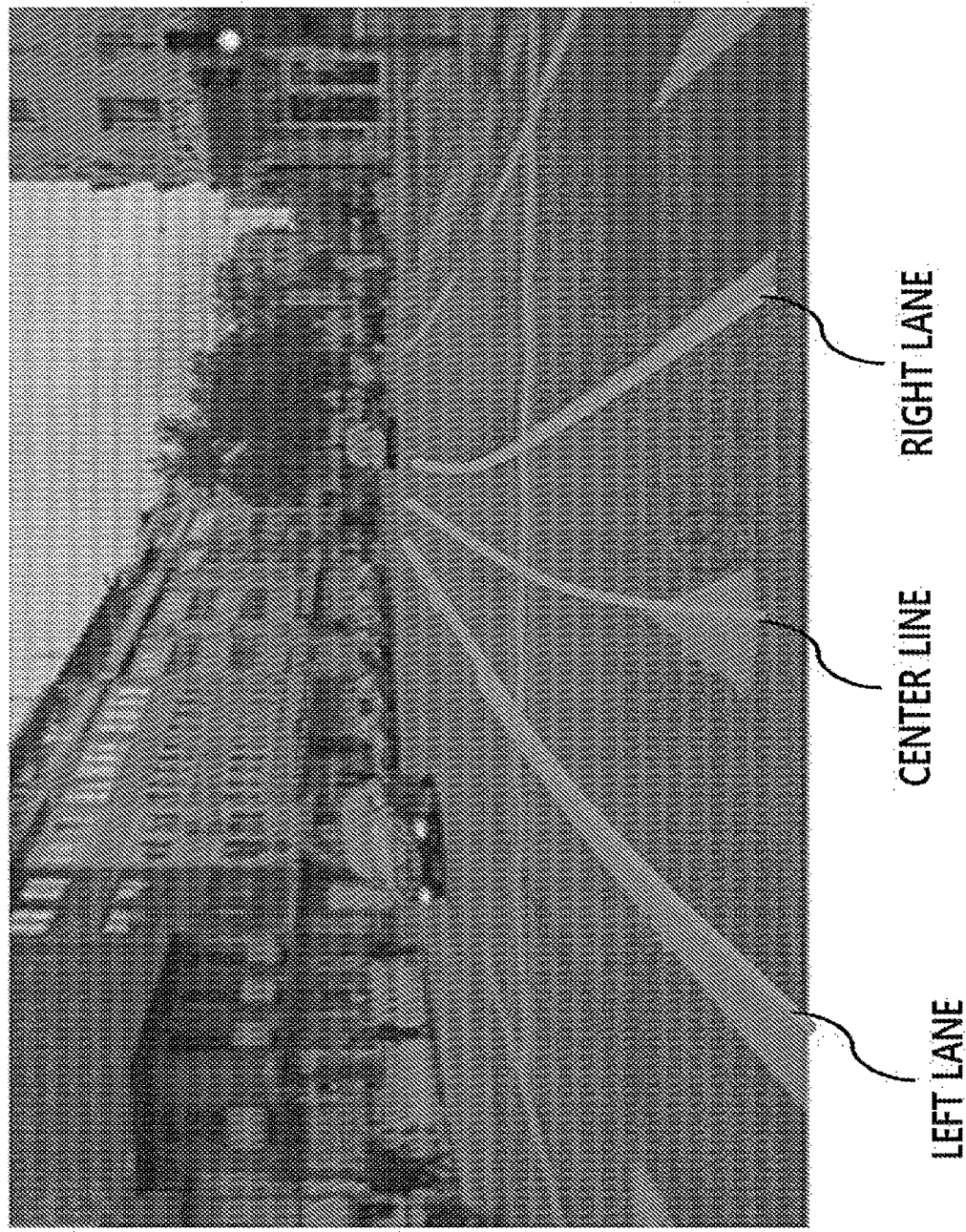
FIG. 1 is an exemplary diagram illustrating a method of driving a lane recognition-based lane centering assistance (LCA) system.
Figure 2:
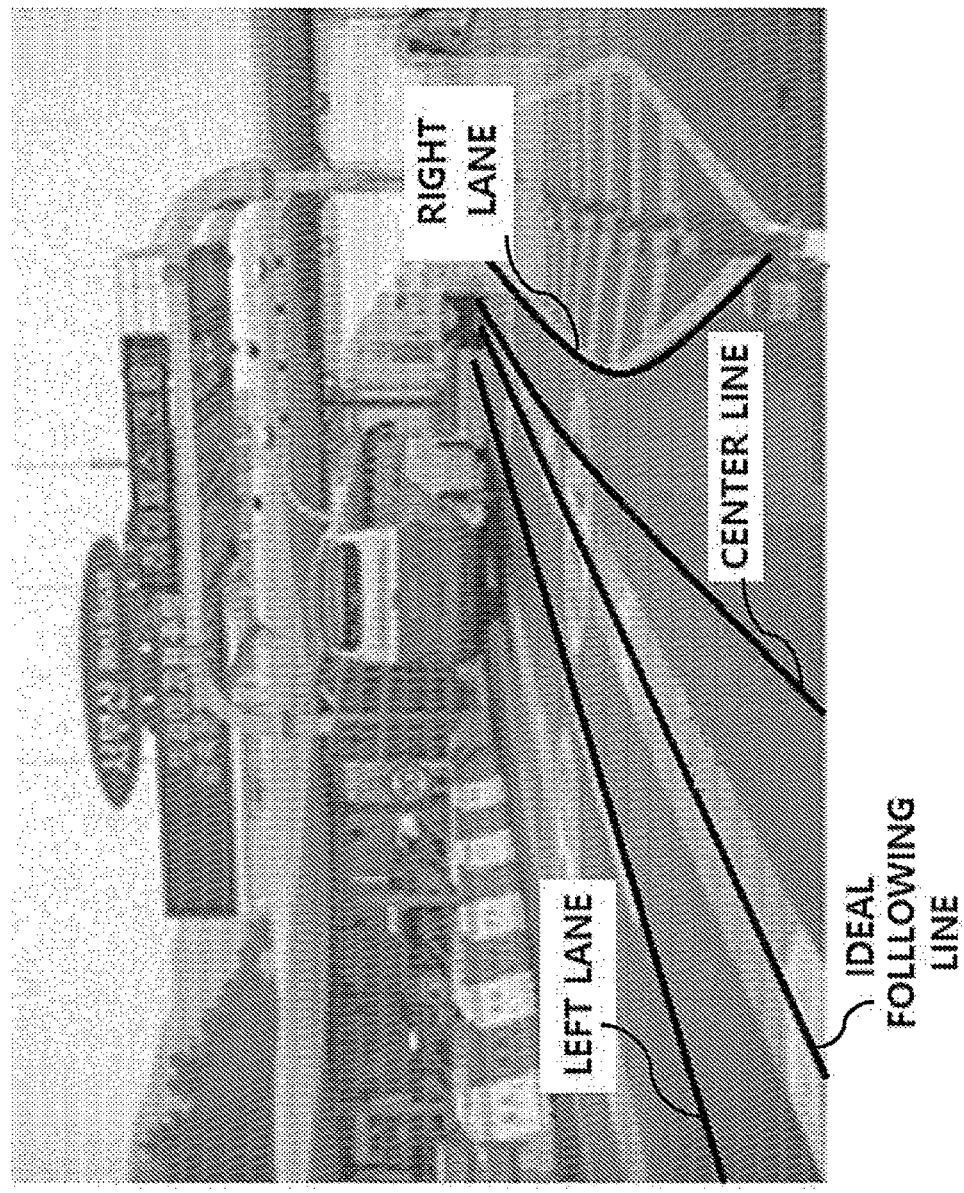
FIG. 2 is an exemplary diagram illustrating a colored guide lane (driving assistance lane) for guiding a case where an angle of a lane suddenly changes, that is, a shape of a vehicle path changes due to various structures, etc., other than a lane on a roadway.

Hereinafter, a preferred embodiment of a lane following system and method considering a driving assistance lane according to the present invention will be described in detail with reference to the accompanying drawings.

A system means a set of components including devices, mechanisms, means, and the like, systematized in order to perform required functions and regularly interacting with one another.

As described above, a lane centering assistance (LCA) system recognizes both lanes (left/right lanes) of an own vehicle path, calculates a centerline of the lane (centerline of a vehicle path), and then controls a steering device of the vehicle to follow the centerline. In the LCA system, since the driving of the vehicle is controlled based on the lane, the stable driving is possible.

However, since a shape of a vehicle or an angle of a lane may suddenly change due to a complex structure (around tollgates, junctions, intersections, etc.) in a vehicle path, there is a problem in that driving stability is lowered and the probability of an accident increases because the performance of the system that simply tracks only the centerline of the lane deteriorates.

Accordingly, the lane following system and method considering a driving assistance lane according to the embodiment of the present invention relate to a technology of recognizing a driving assistance lane (a colored guide lane for entering a tollgate, a junctions, a colored guide lane for entering and exiting a vehicle at an intersection, etc.) other than a lane formed in a vehicle path to control a steering device of a vehicle to follow a lane for stable driving.

Since the driving assistance lane has a different thickness from the lane drawn in a vehicle path (typically, the driving assistance lane is drawn thicker), and is located in a center of the vehicle path rather than a general lane, a geometric transformation is small, so an operation is performed based on the fact that recognition through image analysis is advantageous.

Briefly, in the lane following system and method considering a driving assistance lane according to an embodiment of the present invention, it is preferable to apply a semantic segmentation network to recognize a driving assistance lane and extract the centerline of the driving assistance lane classified through polynomial regression analysis.

Through this, when the driving assistance lane is recognized in the own lane of the currently driving vehicle by analyzing front image data of a vehicle, a control lane that the LCA system follows for steering control changes from the centerline of the vehicle path to the centerline of the driving assistance lane, so the LCA system may stably operate even in a complex environment on a roadway that has to be drawn up to the driving assistance lane, thereby improving the reliability of an ADAS system and expanding its application range.

In addition, in the process of changing the following control lane, it is preferable to perform proportional, integral, differential (PID) control on a steering angle by using a difference between the current centerline of the vehicle and the centerline of the driving assistance lane by the LCA system as an error.

Figure 3:
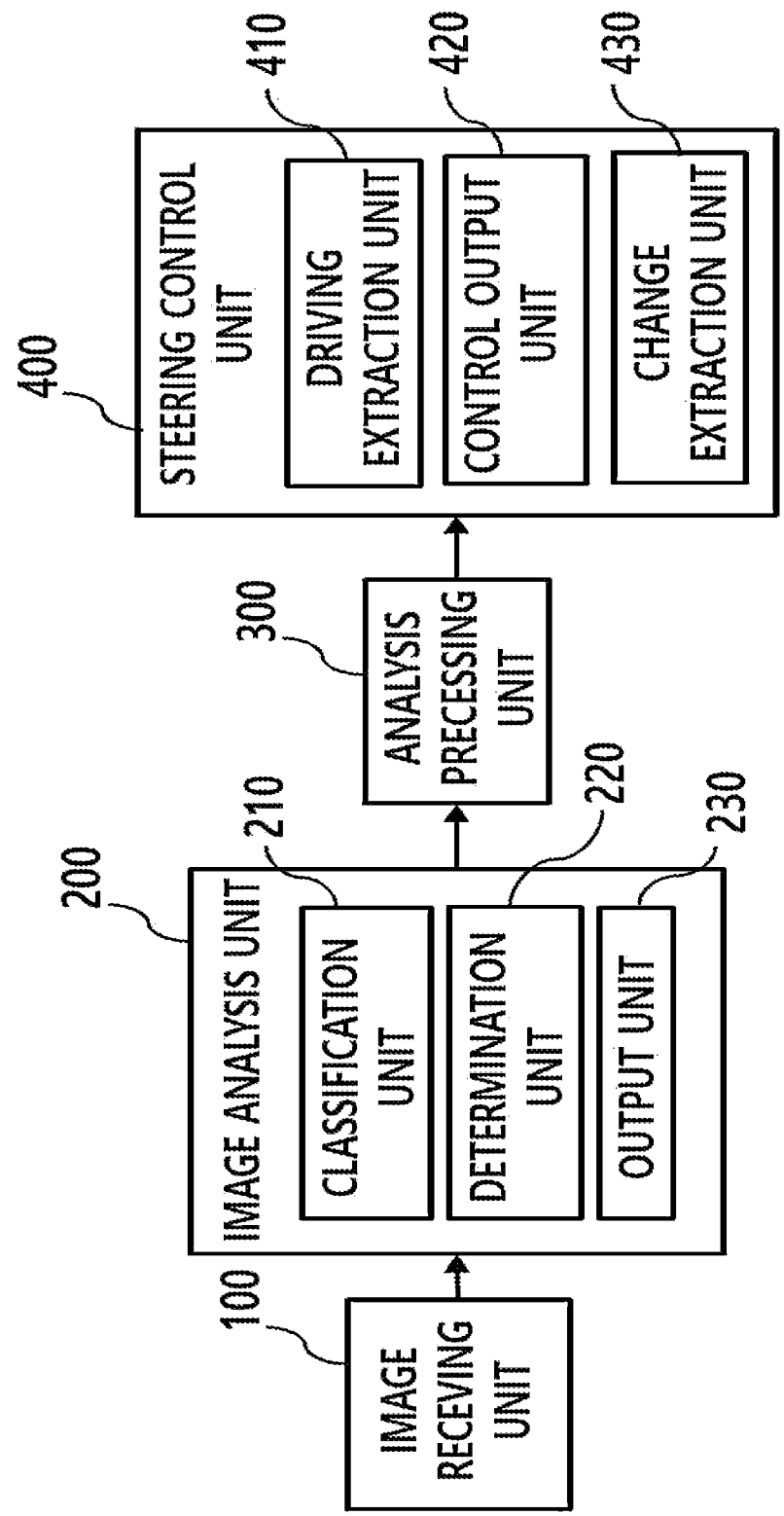
FIG. 3 is an exemplary configuration diagram illustrating a lane following system considering a driving assistance lane according to an embodiment of the present invention.

FIG. 3 illustrates a configuration diagram of the lane following system considering a driving assistance lane according to the embodiment of the present invention.

As illustrated in FIG. 3, the lane following system considering a driving assistance lane according to the embodiment of the present invention may include an image receiving unit 100, an image analysis unit 200, an analysis processing unit 300, and a steering control unit 400. Each of the components preferably performs an operation through a calculation processing means such as an ECU including a computer that performs transmission and reception through an in-vehicle communication channel.

In addition, the lane following system considering a driving assistance lane according to the embodiment of the present invention is a system for controlling a steering device of a vehicle considering the driving assistance lane formed on the vehicle path, that is, the driving assistance lane (colored guide lane, etc.) drawn on the vehicle path.

The respective components will be described in detail.

The image receiving unit 100 receives the front image data of the driving vehicle.

In detail, the front image data is received from a front camera mounted on the centerline of the vehicle, or the front image data generated by matching images input from a plurality of camera sensors mounted on a vehicle to one view is received from a surround view monitoring (SVM) system of the vehicle.

The image analysis unit 200 inputs the front image data by the image receiving unit 100 to the pre-stored network, and extracts feature maps for each pixel constituting the front image data.

As described above, unlike general lanes drawn in the vehicle path, the driving assistance lane has a thick thickness and is located in the center of the vehicle path, so the geometric transformation is small.

Based on this point, the image analysis unit 200 extracts the feature maps for each pixel and uses the extracted features for each pixel to determine whether there is the driving assistance lane corresponding to the preset feature and extracts a pixel coordinate group corresponding to the driving assistance lane when there is the driving assistance lane.

Simply describing, the image analysis unit 200 receives the front image data of the driving vehicle to recognize the driving assistance lane included in the front image data, but since the driving assistance lane is not an object that may be expressed by one pixel, the image analysis unit 200(?) extracts a location coordinate group (set) corresponding to the driving assistance lane.

To this end, the image analysis unit 200 preferably uses a semantic segmentation network, such as U-net, as the pre-stored network.

However, as described above, the semantic segmentation network applied to the image analysis unit 200 is only one embodiment applied to extract the centerline of the object (location coordinate group corresponding to the driving assistance lane) extracted more easily, and determines whether there is the driving assistance lane by analyzing the front image data and any network may be applied as long as a set of location coordinates of the existing driving assistance lane may be derived.

However, the present invention is limited to the semantic segmentation network for a smooth description.

In detail, as illustrated in FIG. 3, the analysis unit 200 includes a classification unit 210, a determination unit 220, and an output unit 230.

The classification unit 210 performs a classification into a plurality of classes by using brightness values for each pixel.

Figure 4:
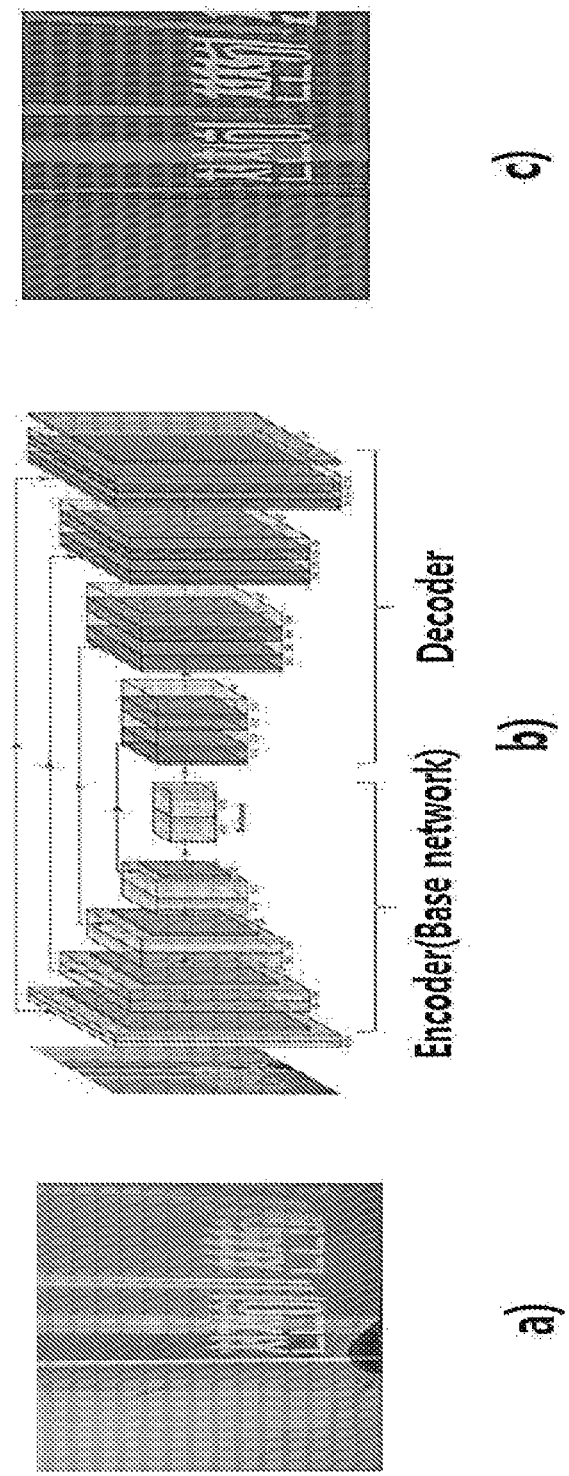
FIG. 4 is an exemplary diagram illustrating an image analysis process by the lane following system considering a driving assistance lane according to an embodiment of the present invention.

That is, as illustrated in FIG. 4A, when the front image data is input to the semantic segmentation network as illustrated in FIG. 4B, the class classification is performed according to the brightness values for each pixel, so the classification result is output as illustrated in FIG. 4C.

In detail, the semantic segmentation network stored in the classification unit 210 includes an encoder and decoder structure, and increases a size of an image by the decoder based on information abstracted from the encoder and performs classification for each pixel.

The determination unit 220 sets a preset predetermined class as a pixel according to the driving assistance lane, and determines whether there is the driving assistance lane including the predetermined class as the classification result by the classification unit 210.

That is, the decoder recognizes the correct shape of the driving assistance lane by transmitting information, such as a boundary line of the objects lost in the abstraction process of the encoder, to an intermediate path.

The stored semantic segmentation network performs supervised learning by obtaining a cross entropy loss for each pixel using an input image and a correct answer image, and updates weights by applying a stochastic gradient descent method.

As the determination result of the determination unit 220, the output unit 230 determines that, when there is the driving assistance lane including the predetermined class, that is, outputs (h0, w0), (h1, w1), . . . , (hN−1, wN−1) which are coordinate groups of a pixel having a maximum value of the class value corresponding to the driving assistance lane among the network output results.

The analysis processing unit 300 extracts the following change driving lane to be followed by the driving vehicle, that is, the centerline of the driving assistance lane, by using the analysis result by the image analysis unit 200.

The analysis processing unit 300 analyzes the coordinate group of the pixel having the maximum value of the class value corresponding to the driving assistance lane by the output unit 230 by using the pre-stored analysis algorithm to extract the centerline of the driving assistance lane and set the extracted centerline as the following change driving lane.

In detail, the analysis processing unit 300 uses a polynomial regression analysis algorithm that is the pre-stored analysis algorithm, and when the coordinate group of the pixel having the maximum value of the class value corresponding to the driving assistance lane among the network output results by the output unit 230 is (h0, w0), (h1, w1), . . . , (hN−1, wN−1), uses a width coordinate as an x-axis and a height coordinate as a y-axis to perform the polynomial regression analysis, thereby extracting the following change driving lane.

In this case, the polynomial regression analysis is performed using the least squares method, and a result of a third-order polynomial regression analysis is represented in Equation 1 below.

$$[a\ b\ c\ d]\begin{bmatrix} w_0^3 & w_1^3 & \ldots & w_{N-1}^3 \\ w_0^2 & w_1^2 & \ldots & w_{N-1}^2 \\ w_0 & w_1 & \ldots & w_{N-1} \\ 1 & 1 & \ldots & 1 \end{bmatrix} = \quad [\text{Equation 1}]$$

$$[h_0\ h_1\ \ldots\ h_{N-1}] \to CW = H \to C = HW^T(WW^T)^{-1}$$

(where a denotes a coefficient of a third-order term, B denotes a coefficient of a second-order term, c denotes a coefficient of the first-order term, d denotes a constant term, h denotes a height direction coordinate of a pixel, w is a width direction coordinate of a pixel, and a polynomial (third order) estimated using the above variables is aw3+bw2+cw+d=h.)

The steering control unit 400 compares a following lane (centerline of the current own lane or centerline of the image) that a driving vehicle currently follows with a following change driving lane by the analysis processing unit 300, and applies the comparison result to the vehicle to generate a control signal for controlling the steering angle of the vehicle.

Figure 5:
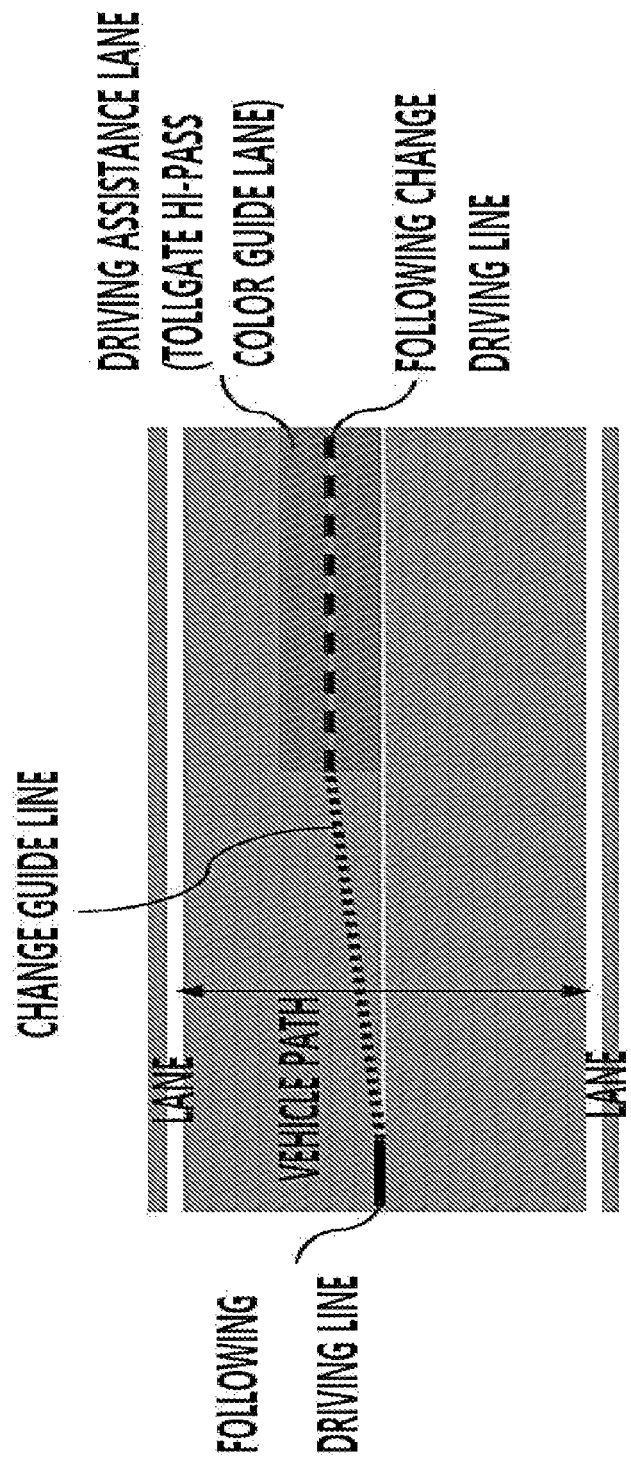
FIG. 5 is an exemplary diagram illustrating a process of processing an image analysis result by the lane following system considering a driving assistance lane according to an embodiment of the present invention.

In detail, as illustrated in FIG. 5, the steering control unit 400 moves a control lane that is being followed by the steering control by the activated LCA system from a vehicle path centerline (following lane) to the centerline (following change driving lane) of the driving assistance lane. In some cases, when the following lane and the following change driving lane do not coincide with each other, by connecting the following lane currently being followed and a start point of a following change driving lane to be followed in the future with a straight line, a change guide lane is generated and used for the steering control. In this case, by using the difference between the following lane and the following change driving lane as an error value, the proportional, integral, differential (PID) control is performed to generate the control signal of the steering device.

As illustrated in FIG. 3, the steering control unit 400 includes a driving extraction unit 410, a control output unit 420, and a change extraction unit 430.

The driving extraction unit 410 receives the front image data received by the image receiving unit 100 and extracts the following lane currently followed by the driving vehicle.

That is, in order to extract the following lane that the driving vehicle currently follows by the LCA system, the centerline of the front image data is extracted.

Of course, most preferably, the centerline of the front image data coincides with the centerline of the own lane in which the vehicle is driving.

However, depending on the driving environment conditions, by considering the fact that it may be difficult to drive along the centerline of the own lane in which the vehicle is driving and the fact that the centerline of the front image data coincide with the centerline of the vehicle even if the vehicle does not drive along the centerline of the own lane in which the vehicle is driving, the driving extraction unit 410 receives the front image data received by the image receiving unit 100, and thus, extracts the centerline of the front image data and sets the extracted centerline as the following lane.

The control output unit 420 compares and calculates a difference value between the following lane extracted by the driving extraction unit 410 and the following change driving lane extracted by the analysis processing unit 320, and uses the difference value to calculate a PID control value to allow the driving vehicle to follow the following change driving lane, and generate the control signal accordingly.

In this case, the PID control has the form of a feedback controller, and has a structure that measures an output value (following lane) of the target to be controlled, compares the measured output value with the desired target value (following change driving lane), calculates an error, and uses the error value to calculate the control value necessary for the control.

The control output unit 420 is a PID controller of a standard type, and is configured to calculate a control value (manipulated variable (MV)) by adding three terms as illustrated in Equation 2 below.

$$MV(t) = K_p e(t) + K_I \int_0^T e(\tau)d\tau + K_d \frac{de(t)}{dt} \quad \text{[Equation 2]}$$

Each term of Equation 2 is proportional to the error value, the integral of the error value, and the differentiation of the error value.

In this case, when the difference between the position of the following lane extracted by the driving extraction unit 410 and the position of the following change driving lane extracted by the analysis processing unit 320 is not large, the sudden change in the position of the vehicle occurs even if the steering angle control according to the steering control is performed, so problems such as ride comfort or driving stability do not occur. However, even if there is a slight change in position depending on a driving speed of the vehicle, since problems such as ride comfort or driving stability may occur, it is preferable that the steering control unit 400 generates a change guide lane through the change extraction unit 430 so that the control lane being followed by the steering control by the activated LCA system is naturally connected from the following lane to the following change driving lane.

To this end, the change extraction unit 430 generates an extended change guide lane so that the following lane extracted by the driving extraction unit 410 is linearly connected with the start point of the following change driving lane extracted by the analysis processing unit 320.

Accordingly, the control output unit 420 compares and calculates the difference value between the following driving lane and the change guide lane to calculate the PID control value so that the driving vehicle follows the change guide lane while following the following driving lane and generates the control signal accordingly. In addition, the control output unit 420 compares and calculates the difference value between the change guide lane and the following change driving lane to calculate the PID control value so that the driving vehicle follows the following change driving lane while following the change guide lane and generate the control signal accordingly.

Accordingly, in the vehicle in which the LCA system is activated, when the driving assistance lane is recognized in the front image data while the steering control is performed while following the centerline of the vehicle path as the control lane (most preferably, when the centerline of the vehicle path coincides with the centerline of the front image data), the control lane changes to the centerline of the driving assistance lane, and thus, the steering control is performed. Accordingly, it is possible to follow a lane while flexibly responding to complex roadway situations, thereby improving the reliability of the LCA system, and furthermore, expanding the range of the road to which the autonomous driving system is applied.

Figure 6:
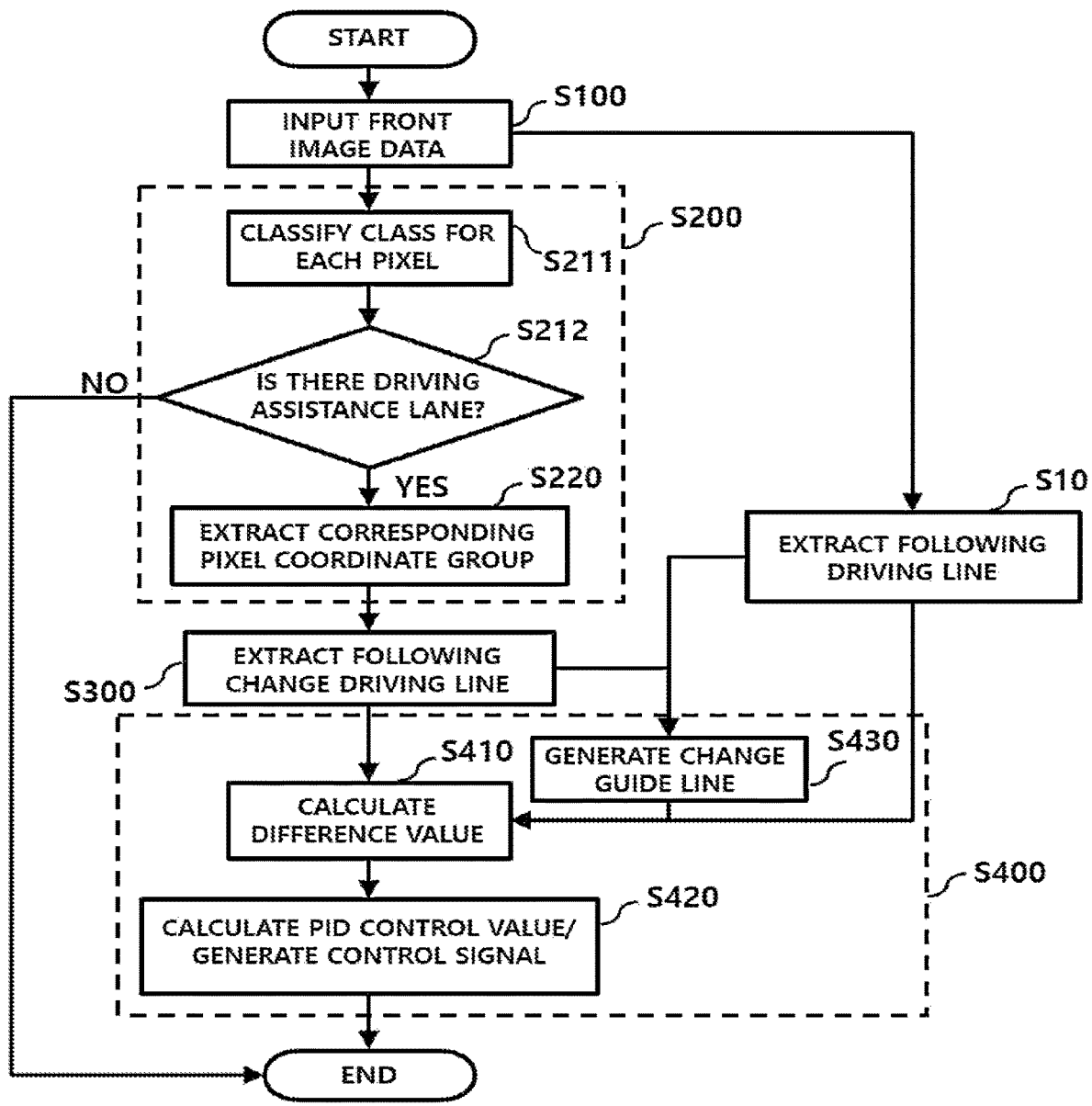
FIG. 6 is an exemplary flowchart illustrating a lane following method considering a driving assistance lane according to an embodiment of the present invention.

FIG. 6 illustrates a flowchart of the lane following method considering a driving assistance lane according to the embodiment of the present invention.

As illustrated in FIG. 6, the lane following method considering a driving assistance lane according to the embodiment of the present invention may include an image input step (S100), an image analysis step (S200), a following change extraction step (S300), and a steering control step (S400). It is preferable to use the lane following system considering a driving assistance lane in which each step operates by calculation processing means.

Of course, in the embodiment of the present invention, a first step of the lane following method considering a driving assistance lane is a step in which the lane centering assistance (LCA) system is activated. By the step, the driving vehicle sets the centerline (centerline of the vehicle path/centerline of both lanes) in the own lane as the control lane, and the steering device of the vehicle is controlled to follow the control lane.

In the image input step (S100), the front image data of the driving vehicle is received by the image receiving unit 100 which is a calculation processing means.

In detail, the front image data is received from a front camera mounted on the centerline of the vehicle, or the front image data generated by matching images input from a plurality of camera sensors mounted on a vehicle to one view is received from a surround view monitoring (SVM) system of the vehicle.

In the image analysis step (S200), the image analysis unit 200, which is the calculation processing means, inputs the front image data by the image input step (S100) to the pre-stored network, and extracts feature maps for each pixel constituting the front image data.

Unlike general lanes drawn in the vehicle path, the driving assistance lane has a thick thickness and is located in the center of the vehicle path, so the geometric transformation is small.

Based on this point, in the image analysis step (S200), the feature maps for each pixel are extracted, and the extracted features for each pixel are used to determine whether there is the driving assistance lane corresponding to the preset feature and the pixel coordinate group corresponding to the driving assistance lane is extracted when there is the driving assistance lane.

That is, in the image analysis step (S200), the front image data of the driving vehicle is received to recognize the driving assistance lane included in the front image data, but since the driving assistance lane is not an object that may be expressed by one pixel, the location coordinate group (set) corresponding to the driving assistance lane is extracted.

The image analysis step (S200) includes a determination step (S210) and a group extraction step (S220), as illustrated in FIG. 6.

In the determination step S210, it is determined whether there is a driving assistance lane having a preset feature by using the features included in each pixel.

In this case, according to the determination result of the determination step S210, when there is the driving assistance lane, the group extraction step S220 for "following the driving assistance lane" is performed, and when there is no driving assistance lane, the "LCA system" currently activated is maintained. That is, when there is no driving assistance lane, the lane following system currently applied to the driving vehicle is maintained.

In this determination step (S210), in more detail, the classification step (S211) and the existence determination step (S212) are performed.

In the classification step S211, the semantic segmentation network, such as the U-net, as the pre-stored network is used to perform the classification into the plurality of classes by using the brightness values for each pixel.

That is, as illustrated in FIG. 4A, when the front image data is input to the semantic segmentation network as illustrated in FIG. 4B, the class classification is performed according to the brightness values for each pixel, so the classification result is output as illustrated in FIG. 4C.

In this case, the semantic segmentation network is only one embodiment applied to extract the centerline of the object (location coordinate group corresponding to the driving assistance lane) extracted more easily, and determines whether there is the driving assistance lane by analyzing the front image data and any network may be applied as long as a set of location coordinates of the existing driving assistance lane may be derived.

However, the present invention is limited to the semantic segmentation network for a smooth description.

In the existence determination unit (S212), the preset predetermined class is set as the pixel according to the driving assistance lane, and as the classification result by the classification step (S211), it is determined whether there is the driving assistance lane based on whether there is the pixel including the predetermined class.

That is, the decoder recognizes the correct shape of the driving assistance lane by transmitting information, such as a boundary line of the objects lost in the abstraction process of the encoder, to an intermediate path.

The stored semantic segmentation network performs supervised learning by obtaining a cross entropy loss for each pixel using an input image and a correct answer image, and updates weights by applying a stochastic gradient descent method.

In the group extraction step (S220), the pixel coordinate group corresponding to the driving assistance lane is extracted as the determination result of the determination step (S210).

That is, as the determination result of the existence determination step (S212), the output unit 230 determines that, when there is the driving assistance lane including the predetermined class, that is, outputs (h0, w0), (h1, w1), . . . , (hN−1, wN−1) which are coordinate groups of a pixel having a maximum value of the class value corresponding to the driving assistance lane among the network output results.

In the following change extraction step (S300), the analysis processing unit 300, which is the calculation processing means, applies the analysis result of the image analysis step (S200) to the pre-stored analysis algorithm to extract the following change driving lane that the driving vehicle needs to follow.

That is, in the following change extraction step (S300), the centerline of the driving assistance lane is extracted according to the pixel coordinate group extracted by the group extraction step (S220), and is set as the following change driving lane.

In detail, in the following change extraction step (S300), the coordinate group of the pixel having the maximum value of the class value corresponding to the driving assistance lane by the group extraction step (S220) by using the pre-stored analysis algorithm is analyzed to extract the centerline of the driving assistance lane and set the extracted centerline as the following change driving lane.

In this case, the polynomial regression analysis algorithm is preferably used as the pre-stored analysis algorithm, and when the coordinate group of the pixel having the maximum value of the class value corresponding to the driving assistance lane among the network output results by the group extraction step (S220) is (h0, w0), (h1, w1), . . . , (hN−1, wN−1), the width coordinate is used as the x-axis and the height coordinate is used as the y-axis to perform the polynomial regression analysis, thereby extracting the following change driving lane.

In this case, the polynomial regression analysis is performed using the least squares method, and a result of a third-order polynomial regression analysis is represented in Equation 1 above.

In the steering control step (S400), the steering control unit 400, which is the calculation processing means, compares the following steering line (centerline of the current own lane or centerline of the image) that the driving vehicle is currently following with the following change driving lane by the following change extraction step (S300) and generates the control signal for the steering angle control of the vehicle according to the comparison result.

In detail, as illustrated in FIG. 5, in the steering control step (S400), the control lane that is being followed by the steering control by the activated LCA system changes from the vehicle path centerline (following lane) to the centerline (following change driving lane) of the driving assistance lane. In some cases, when the following lane and the following change driving lane do not coincide with each other, by connecting the following lane currently being followed and a start point of a following change driving lane to be followed in the future with a straight line, a change guide lane is generated and used for the steering control. In this case, by using the difference between the following lane and the following change driving lane as an error value, the proportional, integral, differential (PID) control is performed to generate the control signal of the steering device.

In this case, in the lane following method considering a driving assistance lane according to the embodiment of the present invention, prior to performing the steering control step S400, the front image data by the image input step S100 is analyzed to further perform the following driving extraction step (S10) that extracts the following lane that the driving vehicle is currently following.

In order to extract the following lane that the driving vehicle currently follows by the LCA system, the centerline of the front image data is extracted.

Of course, most preferably, the centerline of the front image data coincides with the centerline of the own lane in which the vehicle is driving.

However, depending on the driving environment conditions, by considering the fact that it may be difficult to drive along the centerline of the own lane in which the vehicle is driving and the fact that the centerline of the front image data coincide with the centerline of the vehicle even if the vehicle does not drive along the centerline of the own lane in which the vehicle is driving, the received front image data is received, and thus, the centerline of the front image data is extracted and set as the following lane.

The steering control step (S400) includes a comparison calculation step (S410), a control signal generation step (S420), and a guide lane generation step (S430), as illustrated in FIG. 6.

In the comparison calculation step (S410), the difference value between the following lane extracted by the following driving extraction step (S10) and the following change driving lane extracted by the following change extraction step (S300) is compared and calculated.

In the control signal generation step (S420), the PID control value is calculated so that the driving vehicle follows the following change driving lane by using the comparison calculation value by the comparison calculation step (S410), and the control signal is generated accordingly.

In this case, the PID control has the form of a feedback controller, and has a structure that measures an output value (following lane) of the target to be controlled, compares the measured output value with the desired target value (following change driving lane), calculates an error, and uses the error value to calculate the control value necessary for the control.

The PID controller of the standard type is configured to calculate the control value (manipulated variable (MV)) by adding three terms as shown in Equation 2 above.

In this case, when the difference between the position of the extracted following lane and the position of the extracted following change driving lane is not large, the sudden change in the position of the vehicle occurs even if the steering angle control according to the steering control is performed, so problems such as ride comfort or driving stability do not occur. However, even if there is a slight change in position depending on a driving speed of the vehicle, since problems such as ride comfort or driving stability may occur, the change guide lane is generated through the guide lane generation step (S430), so that the control lane being followed by the steering control by the activated LCA system is naturally connected from the following lane to the following change driving lane.

In the guide lane generation step (S430), the change guide lane extended so that the extracted following lane is linearly connected to the start point of the extracted following change driving lane is generated.

Accordingly, the difference value between the following lane and the change guide lane is compared and calculated to calculate the PID control value so that the driving vehicle follows the change guide lane while following the following driving lane and generate the control signal accordingly. In addition, the difference value between the change guide lane and the following change driving lane is compared and calculated to calculate the PID control value so that the driving vehicle follows the following change driving lane while following the change guide lane and generate the control signal accordingly.

That is, in other words, according to the lane following system and method considering a driving assistance lane according to an embodiment of the present invention, in the vehicle in which the LCA system is activated, when the driving assistance lane is recognized in the front image data while the steering control is performed while following the centerline of the vehicle path as the control lane (most preferably, when the centerline of the vehicle path coincides with the centerline of the front image data), the control lane changes to the centerline of the driving assistance lane, and thus, the steering control is performed. Accordingly, it is possible to follow a lane while flexibly responding to complex roadway situations, thereby improving the reliability of the LCA system, and furthermore, expanding the range of the road to which the autonomous driving system is applied.

According to the lane following system and method considering a driving assistance lane according to the present invention as described above, when a driving assistance lane is recognized in an own lane of a vehicle currently being driven by analyzing front image data of the vehicle, an LCA system may stably operate even in a complicated environment on a roadway that needs to be drawn up to the driving assistance lane by changing a following control lane for steering control from a centerline of a vehicle path to a centerline of the driving assistance lane, thereby improving the reliability of an ADAS system.

As a result, it is possible to expand a range of a road to which an autonomous driving system is applied.

The present invention is not limited to the above-described exemplary embodiments, but may be variously applied, and may be variously modified without departing from the gist of the present invention claimed in the claims.

What is claimed is:

1. A lane following system for controlling a steering device of a driving vehicle and responsive to a driving assistance lane formed in a vehicle path, the lane following system comprising:
    an image receiving unit configured to receive front image data of the driving vehicle;
    an image analysis unit configured to input the front image data to a pre-stored network and analyze a feature map for each pixel of the front image data;
    an analysis processing unit configured to extract a lane change driving lane to be followed by the driving vehicle by using a result by the image analysis unit; and
    a steering control unit configured to compare a driving line currently followed by the driving vehicle with the lane change driving lane extracted from the analysis processing unit, and, in response, generate a control signal for controlling a steering angle of the vehicle.

2. The lane following system of claim 1, wherein the image analysis unit determines whether there is a driving assistance lane having a predetermined feature by using features included in each pixel, and, if so, extracts a pixel coordinate group corresponding to the driving assistance lane.

3. The lane following system of claim 2, wherein the image analysis unit implements a semantic segmentation network that includes:
    a classification unit configured to perform a classification into a plurality of classes using brightness values for each pixel;
    a determination unit configured to set a predetermined class as a pixel according to the driving assistance lane, and determine the driving assistance lane including the predetermined class based upon classification by the classification unit; and
    an output unit configured to output a coordinate group including corresponding pixels when the driving assistance lane including the predetermined class is determined by the determination unit.

4. The lane following system of claim 3, wherein the analysis processing unit extracts a centerline of the driving assistance lane according to the coordinate group by using a pre-stored analysis algorithm, and sets the extracted centerline as a lane change driving lane.

5. The lane following system of claim 1, wherein the steering control unit includes:
    a driving extraction unit configured to receive the front image data and extract a driving lane currently followed by the driving vehicle; and
    a control output unit configured to produce a difference value between the extracted driving lane and the lane change driving lane, calculate a proportional, integral, differential (PID) control value so that the driving vehicle follows the lane changing driving lane using the produced value, and generate a control signal accordingly.

6. The lane following system of claim 5, wherein the steering control unit further includes a lane change extraction unit configured to extract the lane change driving lane and then generate a lane change guide lane extended so that the extracted lane is linearly connected to a start point of the lane change driving lane, and the control output unit produces a difference value between the extracted lane driving lane and the lane change guide lane, compares and calculates a difference value between the lane change guide lane and the lane change driving lane, calculates a PID control value using the produced values so that the driving vehicle follows the lane change driving lane along the lane change guide lane, and generates a control signal accordingly.

7. A lane following method responsive to a driving assistance lane and performed by a processor, the lane following method comprising:

an image input step of inputting front image data of a driving vehicle;

an image analysis step of inputting the front image data to a pre-stored network to analyze feature maps for each pixel;

a lane change extraction step of applying the result of the image analysis step to a pre-stored analysis algorithm to extract a lane change driving lane to be followed by a driving vehicle;

a steering control step of comparing a driving lane currently followed by the driving vehicle with the lane change driving lane determined by the lane change extraction step, and, in response, generating a control signal for controlling a steering angle of the vehicle; and a driving extraction step of analyzing the front image data input by the image input step to extract the driving lane currently followed by the driving vehicle.

8. The lane following method of claim 7, wherein the image analysis step includes:

a determination step of determining a driving assistance lane having a preset feature by using features included in each pixel; and a group extraction step of extracting a pixel coordinate group corresponding to the determined driving assistance lane, and when it is determined that there is no driving assistance lane, maintaining the lane following system currently applied to the driving vehicle.

9. The lane following method of claim 8, wherein the determination step uses a semantic segmentation network and includes:

a classification step of performing a classification into a plurality of classes using brightness values for each pixel; and an existence determination step of determining the driving assistance lane based on classification by the classification step, and whether there is a pixel including the predetermined class by setting a predetermined class as the pixel according to the driving assistance lane.

10. The lane following method of claim 8, wherein the lane change extraction step extracts a centerline of the driving assistance lane according to a pixel coordinate group extracted by the group extraction step, and sets the extracted centerline as the lane change driving lane to be followed.

11. The lane following method of claim 7, wherein the steering control step includes:

a comparison step of producing a difference value between the driving lane to be followed extracted by the lane driving extraction step and the lane change driving lane extracted by the lane change extraction step; and a control signal generation step of calculating a PID control value so that the driving vehicle follows the lane change driving lane by using the produced value of the comparison calculation step, and generating a control signal accordingly.

12. The lane following method of claim 11, wherein the steering control step further includes a guide lane generation step of generating a lane change guide lane that extends so that the lane change driving lane extracted by the lane driving extraction step is linearly connected to a start point of the lane change driving lane extracted by the lane change extraction step, in the comparison step, a difference between the lane driving lane and the lane change guide lane is compared and calculated, and a difference between the lane change guide lane and the lane change driving lane is produced, and in the control signal generation step, a PID control value is calculated so that the driving vehicle follows the lane change driving lane along the lane change guide lane by using the produced values, and a control signal is generated accordingly.

* * * * *